United States Patent
Lin et al.

(10) Patent No.: US 6,255,372 B1
(45) Date of Patent: Jul. 3, 2001

(54) TIRE COMPONENTS HAVING IMPROVED TEAR STRENGTH

(75) Inventors: Chen-Chy Lin, Hudson; Hamada Tatsuro, Copley, both of OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/227,927

(22) Filed: Jan. 8, 1999

(51) Int. Cl.$^7$ .................................................... C08K 5/04
(52) U.S. Cl. ......................... 524/112; 525/193; 525/285
(58) Field of Search ........................ 524/112; 525/193, 525/285

(56) References Cited

U.S. PATENT DOCUMENTS

| | | | |
|---|---|---|---|
| 4,299,931 | 11/1981 | Coran et al. | 525/95 |
| 4,675,349 | 6/1987 | Palombo et al. | 523/351 |
| 4,739,005 | 4/1988 | Araki et al. | 524/496 |
| 4,883,837 | 11/1989 | Zabrocki | 525/66 |
| 5,238,997 | * 8/1993 | Bauer et al. | 525/179 |
| 5,292,590 | 3/1994 | Lin et al. | 428/494 |
| 5,341,863 | 8/1994 | Sandstrom et al. | 152/209 |
| 5,597,866 | * 1/1997 | White et al. | 525/240 |
| 5,621,045 | * 4/1997 | Patel et al. | 525/237 |

FOREIGN PATENT DOCUMENTS

| | | |
|---|---|---|
| 0 445 486 A2 | 9/1991 | (EP) . |
| 0 867 471 A1 | 9/1998 | (EP) . |
| 1092174 | 11/1967 | (GB) . |

OTHER PUBLICATIONS

"Improved Durability in OTR Mining Tires" by Walker et al., Katschuk—Gummi, Kunslatolle 38, Johrgang, Nr, Jun., 1985.

"Improving Cutting, Chipping Resistance of Tire Treads" by Engelhardt et al., ITEC '96 Select, pp. 12–19, 1996.

"The Anhydride content of Some Commercial PP–g–MA: FTIR and Titration" by Sclavons, Journal of Applied Polymer Science, vol. 62, pp. 1205–1210, 1996.

"Blends of Elastomers and Thermoplastics—A Review" by J.R. Dunn, Rubber Chemical Technology, vol. 49, pp. 978–991, 1976.

"Modification of Rubbers with Solid Polymers" by Zelenev et al., Sov. Rubber Tech. vol. 29, pp. 21–23, 1970.

"Associations Éolastomères–Plastomères Étude de Quelques Properiétés" by Blondel, Rev. Gen Caoutch Plast., vol. 44, No. 9, pp. 1011–1017, 1967.

"Properties of Tread Vulcanizates Containing Polyethylene and Copolymers of Ethylene with Other Monomers" by Tyurina et al., Sov. Rubber Tech., vol. 30, pp. 15–16, 1971.

"Features of the Change in the Properties of Rubber Mixes and Vulcanizates on the Addition of Plastics" by Tyurina et al., Sov. Rubber Tech. vol. 31, pp. 14–17, 1972.

"Properties of Carcass Vulcanizates for Radial–Ply Tyres" by Priklonskaya et al., Sov. Rubber Tech., vol. 28, pp. 11–13, 1969.

"OREVAC® Coextrusion Adhesives", Elf Atochem North America, Inc., Technical Brochure, Mar., 1997.

"Modification of Polyolefins with Maleic Anhydride" by André H. Hogt, COMPALLOY '90, pp. 181–193, 1990.

"The Maleic Anhydride Grafting of Polypropylene with Organic Peroxides" by Callais, COMPALLOY '90, pp. 359–369.

EXXELOR, Exxelor PO 1015, Exxon Chemical, Technical Brochure, undated.

* cited by examiner

*Primary Examiner*—David W. Wu
*Assistant Examiner*—Ling-Siu Choi
(74) *Attorney, Agent, or Firm*—John N. Hornickel; Daniel N. Hall; Arthur M. Reginelli

(57) ABSTRACT

A tire having improved tear strength including at least one component comprising a vulcanized elastomer from about 5 to about 50 parts by weight polypropylene per one hundred parts by weight elastomer, and from about 0.05 to about 2.0 parts by weight of an anhydride compatibilizing agent per one hundred parts by weight elastomer.

34 Claims, No Drawings

TIRE COMPONENTS HAVING IMPROVED TEAR STRENGTH

TECHNICAL FIELD

This invention relates to improved rubber compositions. More particularly, this invention is directed toward rubber vulcanizates that demonstrate improved tear strength. Specifically, the rubber compositions and vulcanizates of this invention include polypropylene and maleic anhydride as additives to achieve the desired properties. The preferred embodiments of this invention are directed toward vulcanizable compositions of matter that are useful for fabricating tires.

BACKGROUND OF THE INVENTION

Off road or heavy truck tires are often subjected to rough road conditions that produce repetitive, localized high pressure pounding on the tire. These stresses can cause fatigue fracture and lead to crack formation and growth. This degradation of the tire has also been referred to as chipping or chunking of the tread surface or base material.

In an attempt to prevent this degradation, it is known to add reinforcements such as carbon black, silicas, silica/silanes or short fibers. Silica has been found advantageous due to its ability to deflect and suppress cut prolongation, while silanes have been added to bind the silica to unsaturated elastomers. The fibers that have been added include nylon and aramid fibers.

It is also known that the addition of polyolefins to rubber compositions can provide several beneficial properties. For example, low molecular weight, high density polyethylene, and high molecular weight, low density polyethylene, are known to improve the tear strength of polybutadiene or natural rubber vulcanizates. In the tire art, it has also been found that polyethylene increases the green, tear strength of carcass compounds and permits easy extrusion in calendering without scorch. Polypropylene likewise increases the green strength of butyl rubber. Polypropylene has also been effective in raising the static and dynamic modulus of rubber, as well as its tear strength.

Although the addition of polyolefins to rubber compositions is known to provide several beneficial effects, the addition of polyolefin to tire recipes has, heretofore, had a deleterious affect on the mechanical and wear properties of tires, as well as handling and ride comfortability of the tire.

Accordingly, there remains a need in the art to improve the tear strength of rubber vulcanizates, especially those deriving from tire compositions, without sacrificing the other properties of vulcanizates, tire components, or tires.

SUMMARY OF INVENTION

It is therefore an object of the present invention to provide a tire component having increased tear strength, where the tire component is less susceptible to chipping and chunking, without substantially impacting the mechanical and wear properties of the tire component.

It is another object of the present invention to provide a tire component having increased tear strength, where the tire component is less susceptible to chipping or chunking, without substantially impacting the hysteresis properties of the tire component.

It is yet another object of the present invention to provide a vulcanizate having increased tear strength, where the vulcanizate is less susceptible to chipping and chunking, without substantially impacting the mechanical and wear properties of the vulcanizate.

It is still another object of the present invention to provide a vulcanizate having increased tear strength, where the vulcanizate is less susceptible to chipping or chunking, without substantially impacting the hysteresis properties of the vulcanizate.

It is also an object of the present invention to provide vulcanizable compositions of matter that will give rise to a cured product having increased tear strength, where the cured product is less susceptible to chipping and chunking, without substantially impacting the mechanical and wear properties of the cured product.

It is another object of the present invention to provide vulcanizable compositions of matter that will give rise to a cured product having increased tear strength, where the cured product is less susceptible to chipping or chunking, without substantially effecting the hysteresis properties of the cured product.

It is yet another object of the present invention to provide a tire having increased tear strength without substantially impacting the mechanical and wear properties of the tire at high temperatures.

It is still yet another object of the present invention to provide a vulcanizate having increased tear strength without substantially impacting the mechanical and wear properties of the vulcanizate after heat aging.

At least one or more of the foregoing objects, together with the advantages thereof over the known art relating to tire components and compositions for making the same, which shall become apparent from the specification that follows, are accomplished by the invention as hereinafter described and claimed.

In general the present invention provides a tire having improved tear strength including at least one component comprising a vulcanized elastomer; from about 5 to about 50 parts by weight polypropylene per one hundred parts by weight elastomer; and from about 0.05 to about 2.0 parts by weight of an anhydride compatibilizing agent per one hundred parts by weight elastomer.

The present invention also provides a vulcanizable composition of matter comprising an elastomer; up to about 50 parts by weight polypropylene per one hundred parts by weight elastomer; at least 0.05 parts by weight of an anhydride compatibilizing agent per one hundred parts by weight elastomer; and up to about 100 parts by weight of a reinforcing filler per one hundred parts by weight elastomer.

The present invention further provides a vulcanizate prepared by a process comprising the steps of preparing a vulcanizable composition of matter including an elastomer; from about 5 to about 50 parts by weight polypropylene per one hundred parts by weight elastomer; from about 0.05 to about 2.0 parts by weight of an anhydride compatibilizing agent per one hundred parts by weight elastomer; and from about 1 to about 100 parts by weight of a reinforcing filler; and vulcanizing the composition of matter with at least one vulcanizing agent.

PREFERRED EMBODIMENT FOR CARRYING OUT THE INVENTION

It has now been found that the tear strength of rubber vulcanizates can be improved without a corresponding deleterious decrease in the other mechanical properties of the vulcanizates. This result is achieved by the addition of polypropylene and an anhydride compatibilizing agent to a vulcanizable composition of matter. Accordingly, the present invention is directed toward rubber compositions that include polypropylene and an anhydride compatibilizing agent, as well as vulcanizates prepared from these compositions. The preferred embodiments of this invention are directed toward rubber compositions that are useful for fabricating tire components, as well as rubber vulcanizates that are useful as tire components. The practice of the present invention is especially useful in base stock recipes, but inasmuch as the increase in tear strength does not deleteriously impact the wear, mechanical, and hysteresis properties of the rubber, the practice of the present invention may also be applied to the tread and side wall stocks of tires. Furthermore, it should be understood that the practice of the present invention is believed to be especially advantageous for off-road or heavy-duty truck tires, although it is believed that the practice of the present invention will improve other tires such as passenger tires.

In general, the improved vulcanizates of this invention are prepared from rubber compositions that include at least one rubber, at least one type of polypropylene, and an anhydride compatibilizing agent. In general, the composition should include up to about 50 parts by weight polypropylene per one hundred parts by weight rubber and at least about 0.05 parts by weight anhydride compatibilizing agent per one hundred parts by weight rubber. More specifically, the rubber compositions include from about 5 to about 50 parts by weight polypropylene, per one hundred parts by weight rubber (phr) and from about 0.05 to about 2.0 parts by weight of an anhydride compatibilizing agent phr. Preferably, the rubber compositions include at least one rubber, from about 10 to about 35 parts by weight polypropylene phr, and from about 0.2 to about 1.0 parts by weight of an anhydride compatibilizing agent phr. Even more preferably, the rubber compositions include at least one rubber, from about 15 to about 25 parts by weight polypropylene phr, and from about 0.4 to about 0.8 parts by weight of an anhydride compatibilizing agent phr. It should be understood that the compositions of this invention can include more than one type of any one specific component. In other words, the compositions of this invention can include mixtures of various types of polypropylenes, mixtures of various types of anhydride compatibilizing agents, and mixtures of various types of elastomers. Distinctions between the various elastomers, anhydride compatibilizing agents and polypropylenes are set forth below.

The polypropylene that is useful in practicing this invention includes any commercially available polypropylene, and therefore practice of this invention should not be limited to the use or selection of any one particular polypropylene. As those skilled in the art will appreciate, most polypropylene homopolymers have an isotactic microstructure and their purity is related to the catalyst employed to synthesize the polymers. Therefore, polypropylene having an isotactic microstructure is most preferred. Without wishing to limit the scope of the polypropylene homopolymers that can be used in this invention, it is preferred to use polypropylene homopolymers that have been produced from fairly specific catalyst systems such as metallocene catalysts. One specific type of polypropylene homopolymer that can be employed in the practice of this invention includes that polypropylene that is available from Aristech Chemical Corporation of Pittsburgh, Pa. under the tradename FP300F. Numerous other polypropylene homopolymers can be obtained from a variety of other companies as well.

Preferred polypropylenes include those that are commercially available and that have a weight average molecular weight (Mw) of from about 80,000 to about 500,000, more preferably from about 90,000 to about 400,000, and even more preferably from about 100,000 to about 350,00. For purposes of this specification, weight average molecular weight will refer to that molecular weight determined by GPC analysis methods by using polystyrene as a standard. It is also highly preferred to employ polypropylene homopolymers that have a molecular weight distribution (Mw/Mn) of less than about 4.5, preferably less than about 4.0, and even more preferably less than about 3.8.

Copolymers of propylene and ethylene can also be employed as the polypropylene component in this invention and therefore the term polypropylene will include both polypropylene homopolymers and copolymers for purposes of this invention. The propylene-ethylene copolymers can be random, statistical or block copolymers. Preferably, the copolymers will contain some polyethylene crystals. The copolymers should contain a major amount of propylene units and only a minor amount of ethylene units. Specifically, the copolymers should preferably contain less than about 40 percent by weight polyethylene or ethylene units. More preferably, the copolymers should preferably contain less than about 30 percent by weight polyethylene or ethylene units. When preparing mixtures of the various homopolymer or copolymers of polypropylene, care should be taken so as to select components that are compatible with one another. The advantageous properties of the compositions of this invention may not be consistently reproduced where incompatible blends of the various polypropylenes are employed.

The anhydride compatibilizing agent that is useful in practicing this invention includes any of the numerous anhydride compounds that are known in art. Typically, these compounds are based upon cyclic structures that give rise to diacids upon ring opening reactions. Some known anhydrides include maleic anhydride, succinic anhydride, phthalic anhydride, cyclohexane dicarboxylic anhydride, itaconic anhydride, citraconic anhydride, and the like, as well as the numerous alkyl and alkenyl derivatives of these compounds. The preferred compatibilizing agents for this invention include maleic anhydride and phthalic anhydride, with maleic anhydride being the most preferred.

Many of the anhydride compatibilizing agents that can be used in the practice of this invention are commercially available from a number of sources including Aldrich Chemical of Milwaukee, Wis. Also, there are numerous synthetic techniques known and published in the art for making anhydride compounds and therefore the scope of the present invention should not be limited by the commercial availability of any particular anhydride compound.

As noted above, one embodiment of the present invention is directed toward vulcanizable compositions of matter including polypropylene and an anhydride compatibilizing agent, where the composition is useful for fabricating a tire. Although polypropylene and an anhydride compatibilizing agent are added to vulcanizable compositions of matter that are useful for fabricating tires, practice of this invention does not alter the type or amount of other ingredients typically included within these vulcanizable compositions of matter. Accordingly, practice of this invention is not limited to any one particular vulcanizable composition of matter or tire compounding stock.

Typically, these vulcanizable compositions of matter include a rubber component that is blended with reinforcing fillers and at least one vulcanizing agent. These compositions typically also include other compounding additives. These additives include, without limitation, accelerators, oils, waxes, scorch inhibiting agents, and processing aids. As known in the art, vulcanizable compositions of matter containing synthetic rubbers typically include antidegradants, processing oils, zinc oxide, optional tackifying resins, optional reinforcing resins, optional fatty acids, optional peptizers, and optional scorch inhibiting agents.

These vulcanizable compositions are compounded or blended by using mixing equipment and procedures conventually employed in the art. Preferably, an initial masterbatch is prepared that includes the rubber component and the reinforcing fillers, as well as other optional additives such as processing oil and antioxidants. According to this invention, it is preferred to add the polypropylene and anhydride compatibilizing agents during preparation of the initial masterbatch. Once this initial masterbatch is prepared, the vulcanizing agents are blended into the composition. This vulcanizable composition of matter can then be processed according to ordinary tire manufacturing techniques. Likewise, the tires are ultimately fabricated by using standard rubber curing techniques. For further explanation of rubber compounding and the additives conventionally employed, one can refer to *The Compounding and Vulcanization of Rubber*, by Stevens in RUBBER TECHNOLOGY SECOND EDITION (1973 Van Nostrand Reihold Company), which is incorporated herein by reference.

The elastomers that are typically employed within vulcanizable compositions of matter that are useful for making tires include both natural and synthetic elastomers rubbers. For example, these elastomers include, without limitation, natural rubber, synthetic polyisoprene rubber, styrene/butadiene rubber (SBR), polybutadiene, butyl rubber, neoprene, ethylene/propylene rubber, ethylene/propylene/diene rubber (EPDM), acrylonitrile/butadiene rubber (NBR), silicone rubber, the fluoroelastomer, ethylene acrylic rubber, ethylene vinyl acetate copolymers (EVA) epichlorohydrin rubbers, chlorinated polyethylene rubber, chlorosulfonated polyethylene rubbers, hydrogenated nitrile rubber, tetrafluoroethylene/propylene rubber and the like. As used herein, the term elastomer or rubber will refer to a blend of synthetic and natural rubber, a blend of various synthetic rubbers, or simply one type of elastomer or rubber. Also, the elastomers that are useful in practicing this invention include any of the various functionalized elastomers that are conventionally employed in the art of making tires. Inasmuch as the preferred embodiments of the present invention are directed toward off-road and heavy truck tires, it is preferred to employ natural rubber within subtread compounds and SBR or SBR/natural rubber blends in tread compounds.

The reinforcing agents, such as carbon black or silica, typically are employed in amounts ranging from about 1 to about 100 parts by weight per 100 parts by weight rubber (phr), with about 20 to about 80 parts by weight (phr) being preferred, and with about 40 to about 80 parts by weight (phr) being most preferred. The carbon blacks may include any of the commonly available, commercially-produced carbon blacks, but those having a surface area (EMSA) of at least 20 m$^2$/g and more preferably at least 35 m$^2$/g up to 200 m$^2$/g or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used in preparing the carbon black products of the invention. Typical values for surface areas of usable carbon blacks are summarized in the following table.

| CARBON BLACKS | |
|---|---|
| ASTM Designation (D-1765-82a) | Surface Area (m$^2$/g) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds used may be in pelletized form or in unpelletized flocculent mass. Preferably, for more uniform mixing, unpelletized carbon black is preferred.

With respect to the silica fillers, the vulcanizable compositions of the present invention may preferably be reinforced with amorphous silica (silicon dioxide). Silicas are generally referred to as wet-process, hydrated silicas because they are produced by a chemical reaction in water, from which they are precipitated as ultra-fine, spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 m$^2$/g, with the range of about 100 to about 250 m$^2$/g being preferred, and the range of about 150 to about 220 m$^2$/g being most preferred. The pH of the silica filler is generally about 5.5 to about 7 or slightly over, preferably about 5.5 to about 6.8.

When employed, silica can be used in the amount of about 1 part to about 100 parts by weight per 100 parts of polymer (phr), preferably in an amount from about 5 to about 80 phr. The useful upper range is limited by the high viscosity imparted by fillers of this type. Usually, both carbon black and silica are employed in combination as the reinforcing filler. When both are used, they can be used in a carbon black:silica ratio of from about 10:1 to about 1:2. Some of the commercially available silicas that may be used include: Hi-Sil® 215, Hi-Sil® 233, and Hi-Sil® 190, produced by PPG Industries. Also, a number of useful commercial grades of different silicas are available from a number of sources including Rhone Poulenc. Typically, a coupling agent is added when silica is used as a reinforcing filler. One coupling agent that is conventionally used is bis-[3 (triethoxysilyl) propyl]-tetrasulfide, which is commercially available from Degussa, Inc. of New York, N.Y. under the tradename S169.

The reinforced rubber compounds can be cured in a conventional manner with known vulcanizing agents at about 0.5 to about 4 phr. For example, sulfur or peroxide-based curing systems may be employed. For a general disclosure of suitable vulcanizing agents one can refer to Kirk-Othmer, ENCYCLOPEDIA OF CHEMICAL TECHNOLOGY, 3$^{rd}$ Edition, Wiley Interscience, N.Y. 1982, Vol. 20, pp. 365–468, particularly VULCANIZATION AGENTS AND AUXILIARY MATERIALS pp. 390–402, or VULCANIZATION by A.Y. Coran, ENCYCLOPEDIA OF POLYMER SCIENCE AND ENGINEERING, $2^{nd}$ Edition, John Wiley & Sons, Inc., 1989; both of which are incorporated herein by reference. Vulcanizing agents may be used alone or in combination. This invention does not affect cure times, and thus the polymers can be cured for a conventional amount of time. Cured or crosslinked polymers will be referred to as vulcanizates for purposes of this disclosure.

In addition to the advantageous feature of the present invention noted above, the cost of producing tires, especially off-road tires, can be significantly reduced by employing the formulations according to the present invention. Because polypropylene and anhydride additives are added to tire formulations or recipes without deleteriously impacting the ultimate properties of the tires, the use of these additives yields significant cost savings.

In order to demonstrate the practice of the present invention, the following examples have been prepared and tested as described in the Experimental Section disclosed hereinbelow. The examples should not, however, be viewed as limiting the scope of the invention. The claims will serve to define the invention.

GENERAL EXPERIMENTATION

Five rubber stocks were prepared according to the recipe set forth in Table I

TABLE I

Rubber Stock Recipe

| Ingredient | Parts by Weight |
| --- | --- |
| Natural Rubber | 100 |
| Carbon Black (SAF) | 45 |
| Zinc Oxide | 3.5 |
| Retardor | 0.1 |
| Antioxidant | 2.3 |
| Optional ingredients | |
| Isotactic polypropylene | 0–20 |
| Maleic Anhydride | 0–0.6 |
| Masterbatch | 148.9–169.5 |
| Sulfur | 1.3 |
| Accelerator | 1.25 |
| Hardened Fatty Acid | 2 |
| Total | 152.75–174.05 |

The isotactic polypropylene had a weight average molecular weight, as determined by GPC Analysis, of about 250,000, and a melt index of 12 g/10 min (230° C./2.16 Kg, ASTM-D 1238), and was obtained from Aldrich Chemical Company of Milwaukee, Wis. The maleic anhydride was obtained from Aldrich Chemical Company of Milwaukee, Wis. The other ingredients are conventionally used in the art and commercially available from a number of sources. For each stock prepared in this experiment, the ingredients were not varied except for the optional ingredients.

By employing standard compounding techniques, a masterbatch was prepared by mixing the natural rubber, isotactic polypropylene (where applicable), maleic anhydride (where applicable), carbon black, antioxidants, zinc oxide, and retardor within an internal mixer for about five minutes at about 50 r.p.m. The initial temperature was about 110° C., and the drop temperature that was achieved was about 180° C. The masterbatch was allowed to cool, and the hardened fatty acid, sulfur, and accelerator were added to the masterbatch. Mixing was continued for about 30 seconds at 50 r.p.m. The final drop temperature that was achieved was about 110° C.

As noted above, the polypropylene and maleic anhydride were optionally added. Stocks 3, 4, and 5, which represent embodiments of this invention, included both polypropylene and maleic anhydride. Stocks 1 and 2 did not include both ingredients and therefore serve as comparative recipes.

These vulcanizable compositions of matter were then sheeted and molded at about 145° C. for about 33 minutes. The tensile mechanical properties were measured by using the procedure described in ASTM-D 412 at 100° C. The tensile test specimens were round rings with a dimension of 0.05 inches in width and 0.075 inches in thickness. A specific gauge length of 1.0 inch was used for the tensile tests. Also, the tear strengths of the vulcanized stocks were measured by using the procedure set forth in ASTM-D 624 at 100° C. The test specimens employed were nicked round rings with a dimension of 0.25 inches in width, 0.10 inches in thickness, and 44 mm and 57.5 mm in inside and outside diameters, respectively. These specimens were tested at a specific gauge length of 1.750 inches.

Table II includes the amount of polypropylene and maleic anhydride that was added to each stock as well as the results obtained from the tensile testing.

TABLE II

| Stock | 1 | 2 | 3 | 4 | 5 |
| --- | --- | --- | --- | --- | --- |
| Additive | | | | | |
| Polypropylene pbw/phr | — | 20 | 20 | 20 | 20 |
| Maleic Anhydride pbw/phr | — | — | 0.08 | 0.2 | 0.6 |
| Properties | | | | | |
| Tensile Strength at Break @ 100° C. (psi) | 3035 | 1886 | 2469 | 2160 | 2377 |
| Tensile Toughness @ 100° C. | 8366 | 4690 | 6987 | 5482 | 6738 |
| Maximum Elongation @ 100° C. (%) | 691 | 462 | 553 | 484 | 555 |
| 50% Modulus @ 100° C. (psi) | 124 | 251 | 263 | 263 | 250 |
| 300% Modulus @ 100° C. (psi) | 844 | 1289 | 1367 | 1394 | 1310 |
| Tear Strength @ 100° C. (lb/in) | 490 | 555 | 506 | 602 | 620 |
| Travel at Tear (%) | 589 | 419 | 400 | 448 | 513 |

Based on the foregoing data, it should be evident that the addition of polypropylene, such as in Stock 2, increases the tear strength of the vulcanized stock. Many of the mechanical properties of Stock 2, however, greatly degraded as compared to the Stock 1, which did not include any polypropylene. The addition of maleic anhydride slightly improved some of the properties degraded by the addition of polypropylene as represented by Stocks 3, 4, and 5.

The tensile mechanical properties of each stock was also determined after heat aging at 100° C. for 24 hours. Table III includes the data obtained after this aging.

TABLE III

| Stock | 1 | 2 | 3 | 4 | 5 |
|---|---|---|---|---|---|
| Properties | | | | | |
| Tensile Strength at Break @ 100° C. (psi) | 2396 | 2136 | 2057 | 1916 | 2325 |
| Tensile Toughness @ 100° C. | 5539 | 4539 | 4633 | 3907 | 5753 |
| Maximum Elongation @ 100° C. (%) | 541 | 394 | 416 | 377 | 465 |
| 50 % Modulus @ 100° C. (psi) | 139 | 309 | 286 | 278 | 274 |
| 300% Modulus @ 100° C. (psi) | 1062 | 1710 | 1554 | 1582 | 1601 |

Based upon the data gathered after heat aging, it should be clear that the addition of maleic anhydride reduces the deleterious impact that polypropylene has on the tear and tensile mechanical properties of the vulcanized stocks.

Based upon the foregoing disclosure, it should now be apparent that the use of the polypropylene and maleic anhydride within a rubber composition will carry out the objects set forth hereinabove. It is, therefore, to be understood that any variations evident fall within the scope of the claimed invention and thus, the selection of specific component elements can be determined without departing from the spirit of the invention herein disclosed and described. In particular, the vulcanizable compositions of matter according to the present invention are not necessarily limited to those that include any one particular rubber, filler or conventional rubber additive. Thus, the scope of the invention shall include all modifications and variations that may fall within the scope of the attached claims.

What is claimed is:

1. A tire including at least one component comprising:
   a vulcanized elastomer; and
   a tear strength additive prepared by contacting from about 5 to about 50 parts by weight polypropylene per one hundred parts by weight elastomer and from about 0.05 to about 2.0 parts by weight of an anhydride compatibilizing agent per one hundred parts by weight elastomer.

2. A tire, as in claim 1, where said anhydride compatibilizing agent is maleic anhydride, succinic anhydride, phthalic anhydride, cyclohexane dicarboxylic anhydride, itaconic anhydride, citraconic anhydride, or mixtures thereof.

3. A tire, as in claim 2, where said anhydride is maleic anhydride.

4. A tire, as in claim 2, comprising from about 10 to about 35 parts by weight of said polypropylene per one hundred parts by weight elastomer.

5. A tire, as in claim 4, comprising from about 0.2 to about 1.0 parts by weight of said compatibilizing agent per one hundred parts by weight elastomer.

6. A tire, as in claim 1, where said vulcanized elastomer is styrene-butadiene copolymer, butyl rubber, diene rubber, ethylene/propylene/diene rubber, polybutadiene or polyisoprene rubber.

7. A tire, as in claim 1, further comprising up to about 100 parts by weight of a reinforcing filler per one hundred parts by weight elastomer.

8. A tire, as in claim 7, where said reinforcing filler is carbon black, silica or mixtures thereof.

9. The tire of claim 1, where at least one component has a tensile strength at break at 100° C. of at least about 2160 p.s.i.

10. The tire of claim 1, where the at least one component has a maximum elongation at 100° C. of at least about 484 percent.

11. The tire of claim 1, where the at least one component has a tear strength at 100° C. of at least about 500 lb/in.

12. The tire of claim 1, where said polypropylene and said anhydride compatibilizing agent are dispersed within a matrix of said vulcanized elastomer.

13. A tire component prepared by the steps comprising:
   compounding an elastomer, from about 5 to about 50 parts by weight polypropylene per one hundred parts by weight of elastomer, from about 0.05 to about 2.0 parts by weight of an anhydride compatibilizing agent per one hundred parts by weight of elastomer, and at least one vulcanizing agent under conditions sufficient to form a blend without causing the vulcanizing agent to form a vulcanizate;
   fabricating the blend into a desired shape; and
   subsequently effecting vulcanization to thereby form a tire component.

14. A vulcanizate prepared by a process comprising the steps of:
   preparing a vulcanizable composition of matter including an elastomer, from about 5 to about 50 parts by weight polypropylene per one hundred parts by weight elastomer, from about 0.05 to about 2.0 parts by weight of an hydride compatibilizing agent per one hundred parts by weight elastomer; and from about 1 to about 100 parts by weight of a reinforcing filler per one hundred parts by weight elastomer; and
   vulcanizing the composition of matter with at least one vulcanizing agent.

15. A vulcanizate, as in claim 14, where the anhydride compatibilizing agent is maleic anhydride, succinic anhydride, phthalic anhydride, cyclohexane dicarboxylic anhydride, itaconic anhydride, citraconic anhydride, or mixtures thereof.

16. A vulcanizate, as in claim 15, where the anhydride compatibilizing agent is maleic anhydride.

17. A vulcanizate, as in claim 14, where the reinforcing filler is carbon black, silica, or mixtures thereof.

18. A vulcanizate, as in claim 14, where the vulcanizing agent is sulfur.

19. The vulcanizate of claim 14, where the vulcanizate has a tensile strength at break at 100° C. of at least about 2160 p.s.i.

20. The vulcanizate of claim 14, where the vulcanizate has a maximum elongation at 100° C. of at least about 484 percent.

21. The vulcanizate of claim 14, where the vulcanizate has a tear strength at 100° C. of at least about 500 lb/in.

22. A process for forming a tire component comprising:
   blending a rubber, a tear strength additive, and from about 1 to about 100 parts by weight per 100 parts by weight rubber of a reinforcing filler to form a tire compound, where said tear strength additive consists essentially of up to about 50 parts by weight polypropylene per 100 parts by weight rubber and at least 0.5 parts by weight of an anhydride compatibilizing agent per 100 parts by weight rubber; and fabricating said tire compound into a tire component.

23. The process of claim 22, where said anhydride compatibilizing agent is maleic anhydride, succinic anhydride, phthalic anhydride, cyclohexane dicarboxylic anhydride, itaconic anhydride, citraconic anhydride, or mixtures thereof.

24. The process of claim 22, where said anhydride compatibilizing agent is maleic anhydride.

25. The process of claim 22, where said tear strength additive consists essentially of from about 10 to about 35 parts by weight of said polypropylene per one hundred parts by weight rubber and from about 0.2 to about 1.0 parts by weight of said anhydride compatibilizing agent per one hundred parts by weight rubber.

26. The process of claim 22, where said reinforcing filler is carbon black, silica, or mixtures thereof.

27. The tire of claim 1, where said polypropylene includes polypropylene homopolymers, copolymers that include a major amount of propylene units and a minor amount of ethylene units, or mixtures thereof.

28. The vulcanizate of claim 14, where said polypropylene includes polypropylene homopolymers, copolymers that include a major amount of propylene units and a minor amount of ethylene units, or mixtures thereof.

29. The tire of claim 13, where said polypropylene includes polypropylene homopolymers, copolymers that include a major amount of propylene units and a minor amount of ethylene units, or mixtures thereof.

30. The process of claim 22, where said polypropylene includes polypropylene homopolymers, copolymers that include a major amount of propylene units and a minor amount of ethylene units, or mixtures thereof.

31. The tire of claim 27, where the polypropylene is a copolymer of propylene and ethylene, wherein the copolymer contains less than about 30 percent by weight ethylene units.

32. The vulcanizate of claim 28, where the polypropylene is a copolymer of propylene and ethylene, wherein the copolymer contains less than about 30 percent by weight ethylene units.

33. The tire of claim 29, where the polypropylene is a copolymer of propylene and ethylene, wherein the copolymer contains less than about 30 percent by weight ethylene units.

34. The process of claim 30, where the polypropylene is a copolymer of propylene and ethylene, wherein the copolymer contains less than about 30 percent by weight ethylene units.

\* \* \* \* \*